(12) United States Patent
Dereims

(10) Patent No.: US 10,549,446 B2
(45) Date of Patent: Feb. 4, 2020

(54) WATERJET CUTTING MACHINE COMPRISING A DEVICE FOR MOVING A PLATE IN A PLANE

(71) Applicant: HYDROPROCESS, Chalon sur Saone (FR)

(72) Inventor: Philippe Dereims, Chalon sur Saone (FR)

(73) Assignee: HYDROPROCESS, Chalon sur Saone (FR)

( * ) Notice: Subject to any disclaimer, the term of this patent is extended or adjusted under 35 U.S.C. 154(b) by 177 days.

(21) Appl. No.: 15/542,669

(22) PCT Filed: Dec. 23, 2015

(86) PCT No.: PCT/FR2015/053749
§ 371 (c)(1),
(2) Date: Jul. 11, 2017

(87) PCT Pub. No.: WO2016/116675
PCT Pub. Date: Jul. 28, 2016

(65) Prior Publication Data
US 2018/0001507 A1     Jan. 4, 2018

(30) Foreign Application Priority Data
Jan. 22, 2015   (FR) ..................... 15 50521

(51) Int. Cl.
*B26F 3/00* (2006.01)
*B26D 1/02* (2006.01)
(Continued)

(52) U.S. Cl.
CPC .............. *B26F 3/004* (2013.01); *B23Q 1/527* (2013.01); *B26D 1/02* (2013.01); *B26F 1/26* (2013.01)

(58) Field of Classification Search
CPC .............. B26F 3/004; B26F 1/26; B26D 1/02
See application file for complete search history.

(56) References Cited

U.S. PATENT DOCUMENTS 5,367,929 A * 11/1994 Burch .................... A22C 25/00
                                                                83/177
5,372,540 A * 12/1994 Burch ..................... B23Q 1/00
                                                                452/156
(Continued)

FOREIGN PATENT DOCUMENTS

EP        1637294 A1    3/2006
EP        1990144 A2    11/2008

OTHER PUBLICATIONS

International Search Report (with English translation) and Written Opinion dated Apr. 22, 2016 of corresponding International application No. PCT/FR2015/053749; 9 pgs.

*Primary Examiner* — Omar Flores Sanchez
(74) *Attorney, Agent, or Firm* — Maier & Maier, PLLC

(57) ABSTRACT

A device for moving a plate oriented in a plane P in a direction parallel to that plane P, said plate including at least two opposite edges parallel to one another, said plate including at least two arms parallel to one another and movable in a plane parallel to said plane P, one of said arms being directly moved by a first actuator, the other arm being driven by said first arm via a connection member, a drive member mounted on the free end of each of said two arms such as to be pivotable about an axis perpendicular to said plane P and moved by a second actuator, each drive member engaging with an actuation member arranged along one of the edges of the plate.

10 Claims, 3 Drawing Sheets

Figure 1:
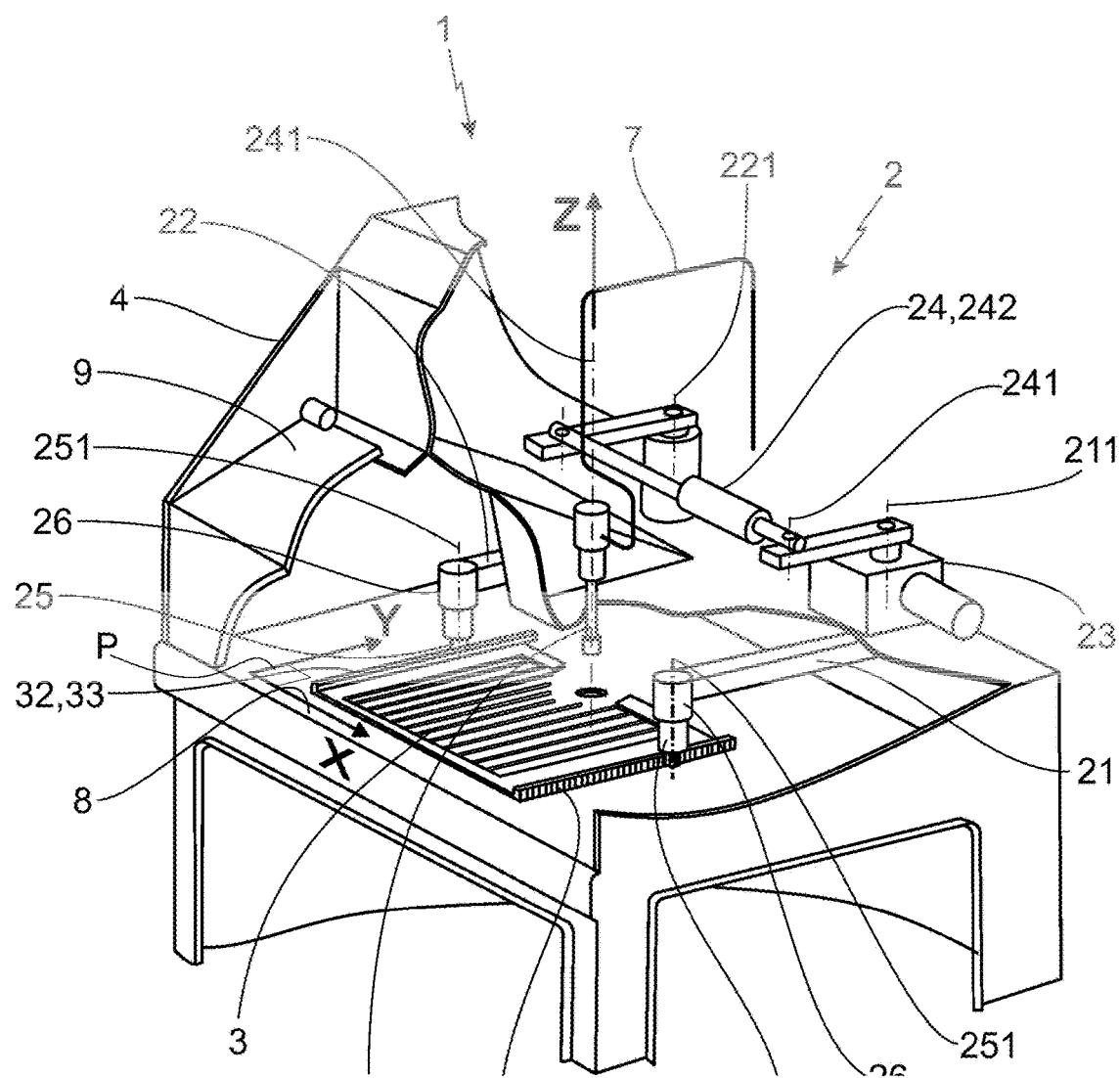

(51) Int. Cl.
  *B23Q 1/52*   (2006.01)
  *B26F 1/26*   (2006.01)

(56) References Cited

U.S. PATENT DOCUMENTS

| | | | | |
|---|---|---|---|---|
| 5,901,270 | A * | 5/1999 | Quin | B26F 3/004 |
| | | | | 264/161 |
| 5,908,349 | A * | 6/1999 | Warehime | B24C 1/045 |
| | | | | 239/430 |
| 6,077,152 | A * | 6/2000 | Warehime | B24C 1/045 |
| | | | | 451/75 |
| 7,047,857 | B2 * | 5/2006 | Adkins | B23Q 1/012 |
| | | | | 83/177 |
| 7,585,201 | B2 * | 9/2009 | Kanai | B24C 1/00 |
| | | | | 451/2 |
| 8,864,553 | B2 * | 10/2014 | Vigano | B24C 5/04 |
| | | | | 451/102 |
| 9,039,485 | B2 * | 5/2015 | Maurer | B24C 3/04 |
| | | | | 451/8 |
| 9,044,873 | B2 * | 6/2015 | Guglielmetti | B26D 5/005 |
| 10,232,467 | B2 * | 3/2019 | Deiss | B23K 10/00 |

* cited by examiner

WATERJET CUTTING MACHINE COMPRISING A DEVICE FOR MOVING A PLATE IN A PLANE

TECHNICAL FIELD

The invention relates to a simple, economical and compact waterjet cutting machine comprising a device for moving a plate in a plane, particularly intended for cutting food products. The invention also relates to the device for sieving a plate in a plane.

PRIOR ART

In the field of cutting food products, waterjet cutting machines consisting of a frame on which there are mounted a loading plate receiving the food products to be cut and a carriage moving longitudinally and transversely on the frame above said place are well known; this carriage is actuated by electric motors or the like and carries a cutting head consisting of a nozzle. During cutting, sprays of fine particles of water and food products are sprayed in the air and come to be housed in the runners of the loading plate, on the rails of the carriage and on the electric motor; which makes cleaning difficult and considerably impairs the hygiene of the cuts. This is because these waterjet cutting devices, although cleaned very frequently, are sources of mould and bacteria.

Moreover, the impacts of moving pressurised water jets against the surface of the food products causes a cloud of water droplets at the cutting zone This cloud does not make it possible to see difficult cuts and therefore to check whether said cuts are made suitably. In addition, this cloud increases the moisture at the surface of the food products to be cut, making this type of machine difficult to apply to food products that must not be wetted, such as for example pastry products, chocolate, pizzas, etc.

This type of cutting machine with a movable cutting head absolutely requires having firstly an aspiration device in order to limit the effect of the cloud of water droplets and secondly pipes that are non-rigid and therefore more complicated and expensive to implement. This is because the pipes that bring the pressurised water from the pump to the nozzle must accompany at least one of the movements of the movable carriage carrying said cutting head.

In order to remedy these drawbacks, waterjet cutting machines comprising an immobile cutting head and a movable plate moving under said cutting head have already been conceived: this is a case, for example, with the patent WO 2004/096507 describing a machine for the waterjet cutting of food products, comprising a device for moving a food product on a cutting table or the like. This device comprises a cutting head, consisting of a nozzle, installed on a fixed support secured to a frame and a ring disposed under this cutting head and able to support the object to be cut. Said ring slides between parallel guide elements so as to be able to pivot and move in the longitudinal direction on said guide elements, said ring being provided on its periphery with a notched edge able to cooperate with notched actuation means disposed along said guide elements staking it possible to perform associated movements of rotation and translation of said ring.

However, this type of device has the drawback of being difficult to use and not being compatible with multiple-nozzle cutting machines since the ring does not move parallel to itself along two axes X and Y.

DISCLOSURE OF THE INVENTION

The aim of the present invention is therefore to overcome the previously mentioned drawbacks and to propose an alternative to the known waterjet cutting machines comprising a cutting head, composed of at least one nozzle and a device for moving a plate, carrying the product to be cut, parallel to itself on two axes X and Y; this alternative making it possible to limit the generation of a cloud of water droplets and to use rigid high-pressure pipes while being compatible with a multiple-nozzle configuration.

In accordance with the first object of the invention, a device for moving a plate parallel to itself in a plane P is therefore proposed, said plate comprising at least two opposite edges parallel to each other, said device being remarkable in that it comprises at least:

two arms parallel to each other and able to move in a plane parallel to said plane P, one of the two arms being called the "master" and directly moved by a first actuator, the other then called the "slave" being moved by the "master" arm by means of a connection member connecting together said "master" and "slave" arms, said connection member being articulated at each of its ends on the "master" and "slave" arras about axes perpendicular to said plane P, a drive member mounted pivotally at one of the ends of each of said arms, about an axis perpendicular to said plane P and moved by a second actuator, the drive member associated with the "master" arm cooperating with an actuation member disposed along one edge of the plate and the drive member associated with the "slave" arm cooperating with an actuation member disposed along the other edge of the plate.

According to a preferred embodiment, each of the two arms pivots at its end opposite to the drive member about respectively an axis perpendicular to said plane P, the first actuator then advantageously being a geared electric motor.

According to a variant embodiment, each of the two arms is able to slide at its end opposite to the drive member in a direction D perpendicular to the two edges of the plate, the first actuator then advantageously being a linear actuator.

Advantageously, the connection member comprises a linear actuator allowing a permanent taking up of clearance between the "master" and the "slave" arms and therefore between the members actuating the plate and the drive members.

Said linear actuator is preferably a cylinder of the single-acting pneumatic type.

According to a preferred embodiment, the members actuating the plate are racks and each drive member cooperating with the associated actuation member is a notched pinion.

The "master" and "slave" arras are preferably hollow tubes.

Each second actuator is a geared electric motor supplied by a cable passing inside one of the associated "master" or "slave" arms.

Another subject matter of the present invention is a waterjet cutting machine comprising at least one frame, a cutting head provided with at least one immobile nozzle secured to said frame, and a cutting table disposed under the nozzle. This cutting machine is remarkable in that it comprises a device for moving a plate in a plane P parallel to itself according to the invention and secured to said frame, and in that the cutting table defines said movement plane P of the plate.

Each nozzle is preferably supplied with pressurised water by a rigid pipe.

Advantageously, the cutting machine comprises a tank for recovering cutting water disposed under the cutting table advantageously vertically in line with the nozzle and provided, at its bottom end with a discharge, and a high-pressure pumping unit disposed under the cutting table and connected to the free end of the pipe.

Furthermore, the cutting machine preferably comprises a cover articulated on the frame, making it possible to have a completely closed and fluid and noisetight working area, said cover being at least partly produced from a transparent material.

SUMMARY DESCRIPTION OF THE FIGURES

Figure 2:
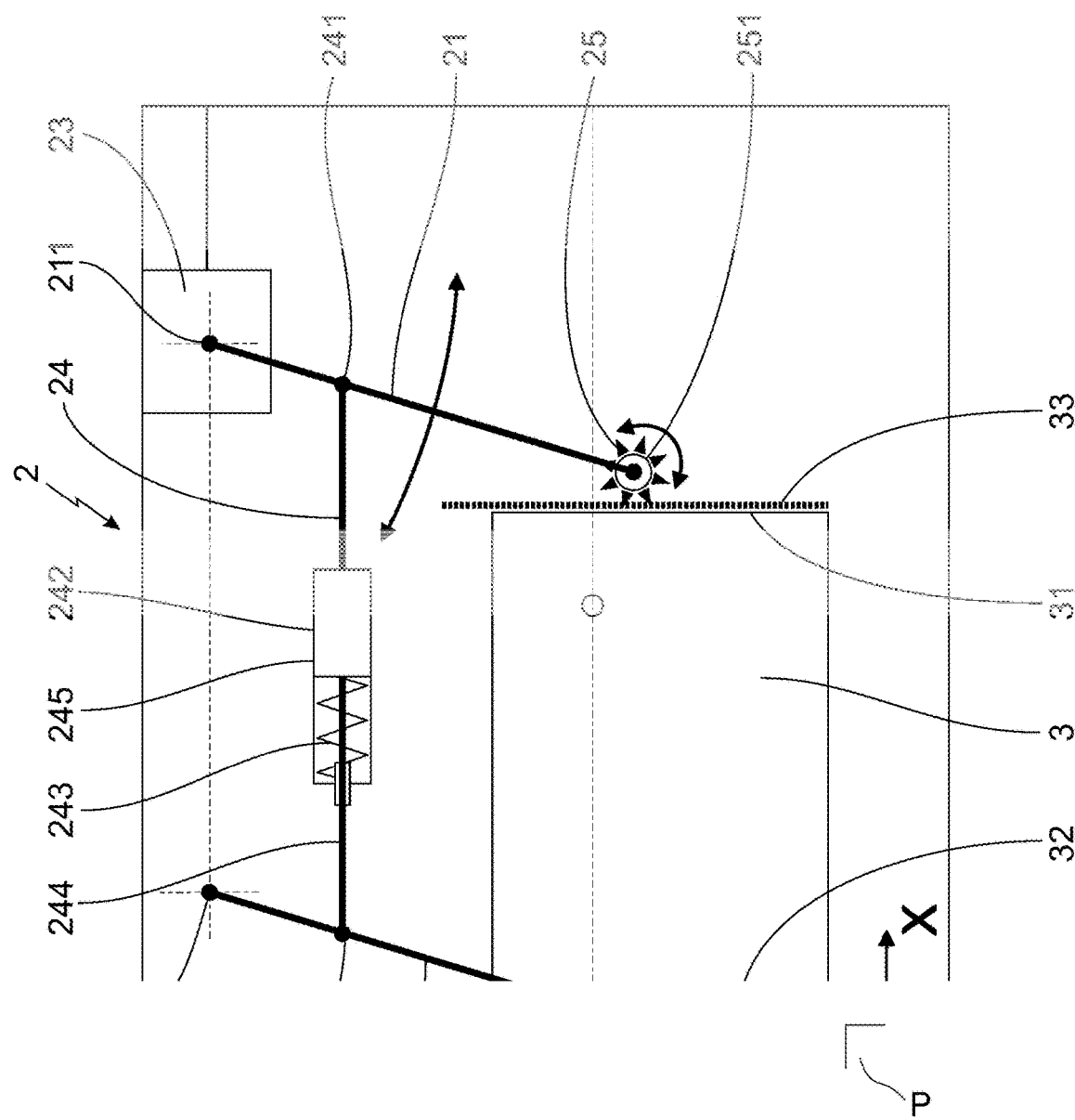
Figure 3:
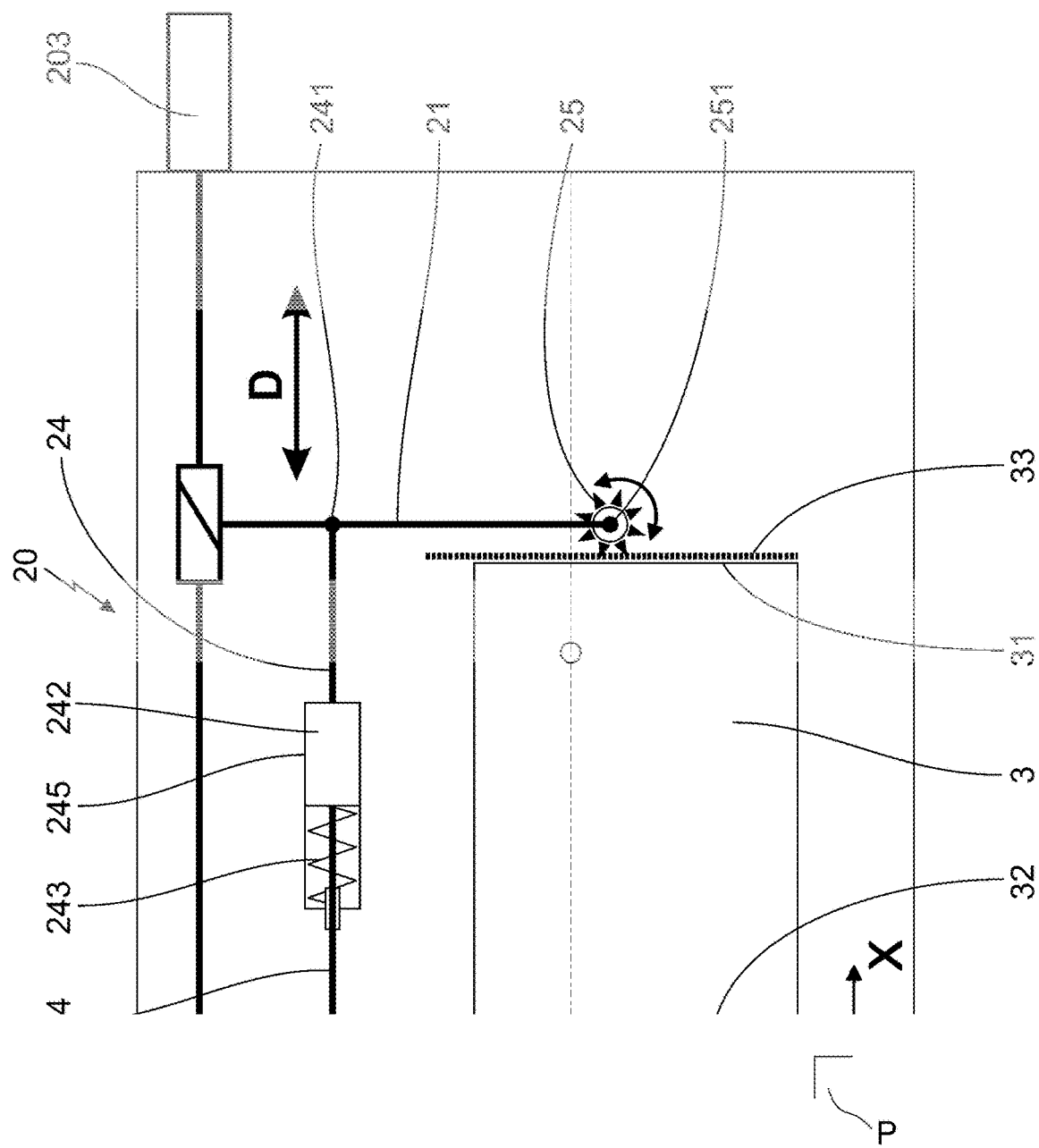

Other advantages and features will, emerge better from the following description of a particular example embodiment, given by way of non-limitative example, of a waterjet cutting machine according to the invention, with reference to the accompanying drawings, on which:

FIG. 1 is a view in partial perspective of a waterjet cutting machine according to the invention comprising a device for moving a plate parallel to itself on two perpendicular axes, FIG. 2 is a schematic representation of the device for moving a plate shown in FIG. 1, FIG. 3 is a schematic representation of a variant embodiment of the device for moving a plate according to the invention.

BEST WAY OF IMPLEMENTING THE TECHNICAL INVENTION

With reference to FIGS. 1 and 2, the water jet cutting machine 1 according to the invention comprising a device 2 for moving a plate 3 parallel to itself on two perpendicular axes X and Y, which will be described by way of non-limitative example, is particularly intended for cutting food products such as for example cakes.

In addition, in the following, the cutting machine 1, and more particularly the movement device 2, will be described in a position for which the plate 3 moves in a substantially horizontal plane P. It goes without saying that the cutting machine 1 or the movement device 2 can be used in any other position without departing from the scope of the present invention.

Likewise, in the following, a cutting machine 1 using water as the cutting fluid will be described. However, it goes without saying that the cutting machine 1 according to the invention can use any other type of cutting fluid without departing from the scope of the present invention.

The cutting machine 1 comprises at least one frame 4 with a roughly parallelepipedal shape, a cutting head 5 provided with at least one immobile nozzle 6 secured to said frame 4 supplied with pressurised water by a rigid pipe 7, and a roughly horizontal, cutting table 8, disposed under the nozzle 6, provided with at least one orifice at its centre to enable the cutting water jet to pass and able to receive the plate 3.

However, it will be understood clearly that, for obvious reasons of adapting the position of the nozzle 6 according to the thickness of object to be cut disposed on the plate 3, said nozzle 6 can be movable in a direction Z perpendicular to said plane P and two perpendicular axes X and Y without departing from the scope of the present invention.

The term "immobile" designates hereinafter the fact that the nozzle 6 of the cutting machine 1 according to the invention is immobile in at least said two perpendicular axes X and Y.

Moreover, the cutting machine 1 preferably comprises:
a cutting-water recovery tank, not shown in the figures, disposed under the cutting table 8 advantageously vertically in line with the nozzle 6 and provided at its bottom end with a discharge that is optionally connected to an aspiration system, not shown in the figures, and
a high-pressure pumping unit, not shown in the figures, disposed under the cutting table 8 and connected to the free end of the pipe 7.

The cutting machine 1 further comprises the device 2 for moving the plate 3 parallel to itself on two perpendicular axes X and Y, said plate 3, which is able to receive the product to be out, having at least two opposite edges 31, 32 parallel to each other, being at least partially perforated, and moving in abutment on a movement plane P determined by the cutting table 8 by means of pins, not shown in the figures, fixed at each of its corners.

Here "movement of the blade 3 parallel to itself" means a movement that includes no rotation of the plate 3.

Said device 2 for moving the plate 3 provided with an actuation member 33 along each of its edges 31, 32 comprises at least:
two arms 21, 22 parallel to each other, each of them being mounted pivotally at one of their ends on the frame 4, about respectively a substantially vertical axis 211, 221 perpendicular to said plane P, one 21 of the two arms 21, 22 being termed the "master" and directly moved by a first actuator 23, the other 22, then termed the "slave", being moved by the "master" arm 21 by means of a connection member 24 connecting together the "master" 21 and "slave" 22 arms,
a drive member 25 mounted pivotally at the free of each of said arms 21, 22, about a substantially vertical axis 251 perpendicular to said movement plane P and moved by a second actuator 26, the drive member 25 associated with the "master" arm 21 cooperating with an actuation member 33 disposed along the edge 31 of the plate 3 and the drive member 25 associated with the "slave" arm 22 cooperating with an actuation member 33 disposed along the other edge 32 of the plate 3.

For reasons of mechanical strength and lightness, the "master" 21 and "slave" 22 arms are advantageously hollow tubes.

The first, actuator 23 is advantageously a geared electric motor with a hollow shaft making it possible to receive one of the ends of the "master" arm 21 and a reversible functioning in order to pivot the latter with precision in one direction or the other about the axis 23. This type of geared motor also has the advantage of being very compact.

According to a preferred embodiment, the members 33 actuating the plate 3 disposed along its edges 31, 32 are racks and each drive member 25 cooperating with the associated actuation member 33 is a notched pinion.

A person skilled in the art will have no difficulty in determining the form and pitch of the teeth suitable for guaranteeing precise movement of the plate 3 when the actuation members 33 rotate.

Each second actuator 26 is advantageously a geared electric motor supplied by a cable, not shown in the figures, routed inside one of the associated "master" 21 or "slave" 22 arms in order not to create retention areas that are difficult to clean and liable to retain fine particles of products sprayed when the cutting water jet impacts and liable to cause undesirable microbial development.

The connection member 24 is articulated at each of its arms on the "master" 21 and "slave" 22 arms respectively about substantially vertical, axes 241 perpendicular to said plane P. Furthermore, the connection member 24 comprises a linear actuator 242 affording a permanent takeup of clearance between the "master" 21 and "slave" 22 arms and therefore between the members 33 actuating the plate 3 and the drive members 25.

With reference to FIG. 2, said linear actuator 242 is preferable a cylinder of the single-acting pneumatic type and comprises a return spring 243 exerting a force tending to return the rod 244 to the "retracted" position, which corresponds to the position in which the rod 244 is almost entirely contained in the body 245 of the cylinder 242.

This configuration makes it possible firstly to continuously take up the clearance between the members 33 actuating the plate 3 and the drive members 25, when the cylinder 242 is supplied, and secondly to bring out the plate 3, for example to clean it, by moving away the "master" 21 and "slave" 22 arms when the cylinder 242 is no longer supplied.

Furthermore, the return spring 243 of the cylinder 242, which holds the latter in the "retracted" position, makes it possible to preserve the position of the plate and to prevent impacts when said cylinder 242 is re-pressurised.

Moreover, the "master" 21 and "slave" 22 arms and the drive members 25 are such that the projection in a horizontal plane of their respective pivot axis 211, 221, 251 forms the four angles of a parallelogram deformable under the action of the first actuator 23.

The device 2 for moving the plate 3 further comprises a control unit, not shown in the figures, for controlling the first actuator 23 and the second actuators 26 in order to effect the movement of the plate 3 along the axes X and Y.

It will be understood clearly that the device 2 for moving the plate 3 makes it possible to produce a compact waterjet cutting machine 1 that is particularly easy to clean. This is because the configuration of said device 2 for moving the plate 3 offers the possibility firstly of confining the first and second actuators 23, 26 and the connection member 24 in housings that are substantially watertight or isolated from the cutting zone, and secondly leaving no supply cable visible in said zone.

Moreover, it will be understood clearly that, since the plate 3 moves parallel to itself on two axes X and Y, the movement device 2 is perfectly compatible with a cutting machine 1 comprising a plurality of fixed nozzles 6.

Finally, with reference to FIG. 1, the cutting machine 1 advantageously comprises a cover 9 hinged on the frame 4 making it possible to have a working area that is completely closed and fluid- and noisetight, said cover 9 preferably being at least partially produced from a transparent material in order to be able to monitor the cutting process.

DESCRIPTION OF OTHER EMBODIMENTS

According to a first variant embodiment shown in FIG. 3, the device 20 for moving the plats 3 provided with an actuation member 33 along each of its edges 31, 32 is similar to the movement device 2 described previously and comprises at least:
  two arms 21, 22 parallel to each other, one 21 of the two arms 21, 22 being termed the "master" and directly moved by a first actuator 203, the other 22 then termed the "slave" being moved by the "master" arm 21 by means of a connection member 24 connecting together the "master" 21 and "slave" 22 arms,
  a drive member 25 mounted pivotally at the free end of each of said arms 21, 22, about a substantially vertical axis 251 perpendicular to said movement plane P and moved by a second actuator 26, the drive member 25 associated with the "master" arm 21 cooperating with an actuation member 33 disposed along the edge 31 of the plate 3 and the drive member 25 associated with the "slave" arm 22 cooperating with an actuation member 33 disposed along the other edge 32 of the plate 3.

However, the movement device 20 differs in that each of the two arms 21, 22 is able to slide at its end opposite to the drive member (25) in a direction D perpendicular to the two edges (31, 32) of the plate (3), said first actuator 203 then being a linear actuator able to move the "master" arm 21 in said direction D.

INDUSTRIAL APPLICABILITY

It will be understood clearly that the cutting machine 1 according to the invention can be used for cutting any other type of product in addition to food products. Likewise, it is obvious that the device 2 for moving the plate 3 according the invention can be adapted to any other type of cutting such as for example laser cutting.

Finally, it goes without saying that the examples or cutting machine 1 and device 2 for moving the plate 3 according to the invention that have just been described are merely particular illustrations, in no case limitative of the invention.

The invention claimed is:

1. A movement device for moving a plate parallel to itself in a plane (P), said plate comprising:
  at least two opposite edges parallel to each other, wherein said device further comprises at least two arms parallel to each other and able to move in a plane parallel to said plane (P), one of said two arms being called the master and directly moved by a first actuator, the other then called the slave being moved by the master arm by means of a connection member connecting together said master and slave arms, said connection member being articulated at each of its ends on the master and slave arms about axes perpendicular to said plane (P),
  a drive member mounted pivotally at one of the ends of each of said arms, about an axis perpendicular to said plane (P) and moved by a second actuator, the drive member associated with the master arm cooperating with an actuation member disposed along the edge of the plate and the drive member associated with the slave arm cooperating with an actuation member disposed along the other edge of the plate.

2. The movement device according to claim 1, wherein each of the two arms pivots at its end opposite to the drive member about respectively an axis perpendicular to said plane (P).

3. The movement device according to claim 2, wherein the first actuator is a geared electric motor.

4. The movement device according to claim 1, wherein each of the two arms is able slide at its end opposite to the drive member in a direction (D) perpendicular to the two edges of the plate.

5. The movement device according to claim 4, wherein the first actuator is a linear actuator.

6. The movement device according to claim 1, wherein the connection member comprises a linear actuator affording a permanent takeup of clearance between the master and slave arms and therefore between the members for actuating the plate and the drive members.

7. The movement device according to claim 6, wherein the linear actuator is a cylinder of the single-acting type.

8. The movement device according to claim 1, wherein the members for actuating the plate are racks and in that each drive member cooperating with the associated actuation member is a notched pinion.

9. The movement device according to claim 1, wherein the master and slave arms are hollow tubes.

10. The movement device according to claim 9, wherein each second actuator is a geared electric motor supplied by a cable routed inside one of the associated master or slave arms.

* * * * *